US008126416B2

United States Patent
Nakajima et al.

(10) Patent No.: US 8,126,416 B2
(45) Date of Patent: Feb. 28, 2012

(54) BROADCAST RECEIVING APPARATUS

(75) Inventors: Nobuo Nakajima, Tokyo (JP); Koichi Gyoda, Tokyo (JP); Eiji Shibuya, Kobe (JP); Takehiro Onomatsu, Osaka (JP); Hideto Yoshimura, Osaka (JP)

(73) Assignees: Funai Electric Co., Ltd., Daito-shi, Osaka (JP); The University of Electro-Communications, Choufu-shi, Tokyo (JP); DX Antenna Company, Limited, Kobe-shi, Hyogo-ken (JP)

( * ) Notice: Subject to any disclaimer, the term of this patent is extended or adjusted under 35 U.S.C. 154(b) by 770 days.

(21) Appl. No.: 12/228,790

(22) Filed: Aug. 15, 2008

(65) Prior Publication Data

US 2009/0051591 A1 Feb. 26, 2009

(30) Foreign Application Priority Data

Aug. 22, 2007 (JP) ................. 2007-216293

(51) Int. Cl.
*H04B 1/06* (2006.01)
*H04B 7/00* (2006.01)
(52) U.S. Cl. ........ 455/272; 455/13.3; 455/25; 455/63.4; 455/82; 455/73; 455/562.1; 455/575.7; 455/13.4; 455/572; 342/367; 342/372
(58) Field of Classification Search .......... 455/272, 455/13.3, 25, 63.4, 82, 562.1, 575.7, 13.4, 455/572, 127.1, 73; 342/342, 367, 372
See application file for complete search history.

(56) References Cited

U.S. PATENT DOCUMENTS

| 7,397,516 B2* | 7/2008 | Tsukamoto ................. 348/725 |
| 7,509,666 B2* | 3/2009 | Takagi et al. .................. 725/72 |
| 7,624,414 B2* | 11/2009 | Onomatsu et al. ............. 725/72 |
| 7,679,687 B2* | 3/2010 | Kaneko ....................... 348/725 |
| 2005/0250452 A1* | 11/2005 | Walton et al. ............... 455/63.4 |
| 2006/0010474 A1* | 1/2006 | Tsukamoto .................... 725/72 |
| 2006/0125708 A1* | 6/2006 | Narita ........................... 343/818 |
| 2006/0141968 A1* | 6/2006 | Masaki ........................ 455/272 |

FOREIGN PATENT DOCUMENTS

| JP | 2005-318140 A | 11/2005 |
| JP | 2005-354632 A | 12/2005 |
| JP | 2006-217230 A | 8/2006 |

* cited by examiner

*Primary Examiner* — Temesgh Ghebretinsae
*Assistant Examiner* — MD Talukder
(74) *Attorney, Agent, or Firm* — Yokoi & Co., U.S.A., Inc.; Toshiyuki Yokoi

(57) ABSTRACT

With a power supply provided for a smart antenna, whether the antenna is connected is determined according to whether the power supply is connected. When it is determined that the smart antenna is not connected, power supply to units related only to controlling of the smart antenna is stopped, whereby power saving is realized. Further, user's setting for discriminating kinds of antennas becomes unnecessary and, when a smart antenna is not connected, power supply for the same can be prevented.

9 Claims, 3 Drawing Sheets

BROADCAST RECEIVING APPARATUS

CROSS-REFERENCES TO RELATED APPLICATIONS

The entire disclosure of Japan Patent Application No. 2007-216293, filed Aug. 22, 2007, is expressly incorporated by reference herein.

BACKGROUND OF THE INVENTION

1. Field of the Invention

The present invention relates to a broadcast receiving apparatus connectable with a variable directivity antenna and a directional antenna.

2. Description of the Related Art

There have been known broadcast receiving apparatuses connectable with a directional antenna capable of receiving only waves coming from one direction and, in addition, connectable with a variable directivity antenna capable of receiving waves coming from various directions. Further, there have been disclosed various technologies to receive broadcast waves with the use of such a variable directivity antenna.

In JP-A No. 2006-217230 (hereinafter referred to as "patent document 1"), for example, there is disclosed a technology for a broadcast receiving apparatus using a variable directivity antenna to ensure connection of the variable directivity antenna thereby improving safety of the apparatus.

Also, in JP-A No. 2005-354632 (hereinafter referred to as "patent document 2"), there is disclosed a technology for setting up a smart antenna (variable directivity antenna) enabling an optimum receiving direction to be detected in a short period of time.

Further, in JP-A No. 2005-318140 (hereinafter referred to as "patent document 3"), there is disclosed a technology, while using a variable directivity antenna for receiving an analog broadcast signal, enabling the broadcast signal to be detected unaffected by ghost.

When both a variable directivity antenna and a directional antenna are connectable to an apparatus, it has so far been necessary for the user to make setting each time according to which of them is connected to the apparatus. Further, while a variable directivity antenna requires power supply to an amplifier incorporated therein and others, the power supply has sometimes been made even when the variable directivity antenna is not connected, Although there is disclosed, in patent document 1, a technology for connecting a variable directivity antenna, a technology for saving power is not disclosed.

Further, there is no disclosure made in patent document 2 and patent document 3 about technology to confirm connection of a variable directivity antenna or about power saving.

BRIEF SUMMARY OF THE INVENTION

The present invention has been made in view of the above situation. It is an object of the present invention to provide a broadcast receiving apparatus enabling confirmation as to which of a variable directivity antenna and a directional antenna is connected to be made without waiting for user's setting and, when the variable directivity antenna is not connected, capable of saving power therefor.

In order to achieve the above mentioned object, in the broadcast receiving apparatus as the main invention provided with:

a connection circuit connectable with a variable directivity antenna and a directional antenna;

a tuner connected to the connection circuit for performing receiving processes of broadcast waves; and a control unit for performing control of power supply to the variable directivity antenna and directivity control thereof, the apparatus is further provided with:

a first power receiving terminal for supplying the broadcast receiving apparatus with necessary power;

a second power receiving terminal for supplying the variable directivity antenna with necessary power;

a decision circuit for determining whether or not power is being supplied to the second power receiving terminal; and a drive control circuit for driving, when the decision circuit determines that power is being supplied to the second power receiving terminal, the control unit to control the variable directivity antenna.

Other features of the present invention will be made clearer by reading this specification and referring to the accompanying drawings.

DETAILED DESCRIPTION OF THE INVENTION

Figure 1:
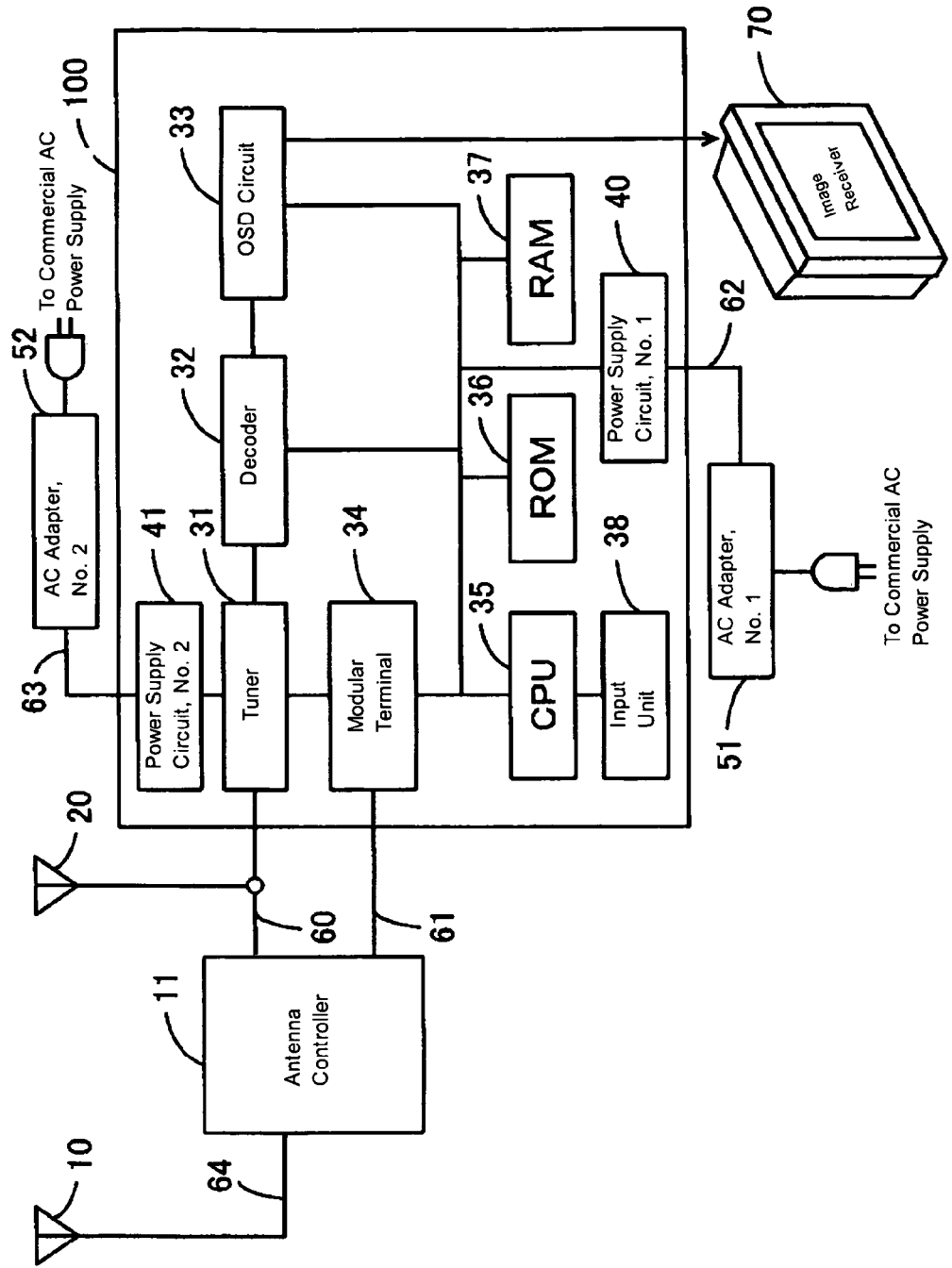
FIG. 1 is a schematic block diagram of STB according to a present embodiment.

At least the following items will be made clear by descriptions in this specification and the accompanying drawings.

In the main invention constituted as described above, when the power necessary for the variable directivity antenna is being supplied with the second power receiving terminal connected, it is determined that the variable directivity antenna is connected and control of the variable directivity antenna is started.

By constituting the apparatus as described above, it can be determined whether or not the variable directivity antenna is connected without waiting for user's setting. Further, when the variable directivity antenna is not connected, power for the same can be saved.

As an example of the above broadcast receiving apparatus, the same can be configured to include a commercial power adapter capable of supplying power individually to the first power receiving terminal and to the second power receiving terminal.

By making such a configuration, necessary power supplies can be taken out from one commercial power supply.

As an example of the above broadcast receiving apparatus, the same can be configured to include a power adapter dedicated to each of the first power receiving terminal and the second power receiving terminal.

By making such a configuration, each of necessary power supplies can be obtained individually.

As an example of the above variable directivity antenna, the same can be configured to have directivities in 16 directions and has no movable portion.

If antennas are configured as above, they become compliant with standards for general variable directivity antennas in the US and others.

As an example of the above variable directivity antenna, the same can be configured to have directivities in 16 directions and has a movable portion.

If antennas are configured as above, they can be compliant with standards for general variable directivity antennas in the US and others. Further, by having the moving portion, the receiving range of the antenna can be expanded.

As an example of the above mentioned decision circuit, such a configuration can be made in which CPU determines whether present or absent a power supply to the second power receiving terminal is.

If such a configuration is made, CPU incorporated in the broadcast receiving apparatus is enabled to determine whether present or absent the power supply is.

As an example of the above broadcast receiving apparatus, the same can be configured to have CPU controlling power supply to the variable directivity antenna.

If such a configuration is made, CPU incorporated in the broadcast receiving apparatus is enabled to control power supply to the variable directivity antenna.

As a more concrete configuration, the apparatus may have:

a smart antenna having directivities in 16 directions and provided with a movable portion;

CPU functioning as the decision circuit determining presence or absence of a power supply to the second power receiving terminal;

the second power receiving terminal supplying, under control of CPU, power to an amplifier incorporated in the variable directivity antenna through the tuner; and an AC-DC adapter dividing a commercial power supply voltage into two power supply voltages and supplying the power voltages separately to the first power receiving terminal and the second power receiving terminal.

In the invention more concretely configured as above, advantages like those obtained in the earlier described configuration can of course be obtained.

Below will be described an embodiment of the present invention realized in a digital/analog receiver (hereinafter referred to as Set Top Box (STB)) compliant with the US EIA909 standard.

In the present embodiment, a smart antenna may be used as the variable directivity antenna. However, the variable directivity antenna in the present invention is not limited to that but any other antenna may be used if the directivity thereof is switchable. As the directional antenna, a YAGI antenna may be used in the present embodiment. However, the directional antenna is not limited to that but any other antenna may be used if it is a directional antenna having an anisotropic receiving sensitivity.

FIG. 1 is a schematic block diagram of STB 100.

Referring to FIG. 1, the STB 100 includes a tuner 31 for receiving a signal received by the antenna, a decoder 32 for decoding the broadcast signal received by the tuner 31, and an OSD circuit 33 for generating display information such as contents of setting made in the STB 100. Further, the STB 100 includes a modular terminal 34 for controlling the smart antenna through an antenna controller 11. Still further, the STB 100 includes CPU 35 for controlling the STB 100, ROM 36 for storing programs and the like to be executed by CPU 35, RAM 37 functioning as a temporary storage device for CPU 35, and an input unit 38 accepting external information produced by buttons and the like. First power supply circuit 40 supplies power to each unit of the STB 100 and second power supply circuit 41 supplies power to the antenna controller 11 and smart antenna 10 through the tuner 31 and modular terminal 34.

Further, the STB 100 is connected to the smart antenna 10 or YAGI antenna 20 through the antenna controller 11. This connection is made alternatively to one of the smart antenna 10 or the YAGI antenna 20, not to both of the antennas.

Incidentally, the smart antenna is made up of a plurality of antenna elements and is adapted such that its directivity is switched by exciting each of the antenna elements in suitable amplitude and phase. Further, the smart antenna 10 in the present embodiment, like the STB 100, is compliant with EIA909 standard.

The STB 100 is connected, at modular terminal 34, to a modular terminal of the antenna controller 11 through signal line 61. The STB 100 supplies power to the antenna controller 11 and the smart antenna 10 through the signal line 61. It further appropriately transmits a signal for switching the directivity and the like. The smart antenna 10, in response to the signal transmitted from the STB 100, controls antenna elements to vary its directivity.

The antenna controller 11 supplies, through signal line 64, the smart antenna 10 with the power supplied and various signals transmitted from the STB 100. Further, the antenna controller 11 receives, through the signal line 64, broadcast waves received by the smart antenna 10 and sends them to the tuner 31.

The signal line 64 connects an RF terminal of the smart antenna 10 with an RF terminal of the antenna controller 11. Signal line 60 includes a distributor and connects an RF terminal of the antenna controller 11 or an RF terminal of the YAGI antenna 20 with an RF terminal of the STB 100, whereby one of the RF terminals of the smart antenna 10 or the YAGI antenna 20 comes to be connected with the RF terminal of the STB 100.

The tuner 31 incorporates therein a digital demodulator. The digital demodulator demodulates the broadcast signal obtained by the tuner 31 into an MPEG signal as a video and audio signal and outputs the MPEG signal to the decoder 32. Here, the digital television broadcast signal is transmitted after being coded by a Reed-Solomon code and a convolutional code. Therefore, the digital demodulator can make error correction. During the error correcting process, the digital demodulator calculates a received data error rate of the received broadcast signal and outputs the received data error rate to CPU 35. Since, at this time, the digital demodulator performs the error correction on each of predetermined pieces of data included in the received broadcast signal, it can calculate the received data error rate within one frame (1/30 second) after the start of reception. According to the received data error rate, CPU 35 can determine whether good or bad the signal of the broadcast signal is.

Other than ISDB-T system in Japan, there are digital television broadcast systems such as ATSC system in the US and DVB-T system in Europe. Since broadcast signals are broadcast after being coded in any of the above systems, error correction can be performed and calculation of the received data error rate can be carried out in the course of processing. Therefore, the digital demodulator in the present embodiment can be used in any of the above mentioned systems.

The tuner 31 also has an analog demodulator incorporates therein. Such an analog demodulator demodulates the broadcast signal received by the tuner 31 into a video signal and audio signal. The signal demodulated in the analog demodulator is sent to the OSD circuit 33 without being processed in the decoder 32.

An analog television broadcast signal includes a horizontal synchronizing signal and a vertical synchronizing signal for controlling horizontal scanning and vertical scanning of scanning lines. The analog demodulator has to capture the horizontal synchronizing signal and vertical synchronizing signal to perform demodulation of the video signal. Incidentally, a horizontal synchronizing signal has a sufficiently higher frequency than a vertical synchronizing signal. Therefore, the horizontal synchronizing signal is much more liable to be affected by noises and the like, as compared to the vertical synchronizing signal. Namely, the reception condition is determined according to whether or not the horizontal synchronizing signal is captured.

In analog television broadcast systems, there are, other than NTSC system in Japan and the US, PAL system in Germany, GB, etc. and SECAM system in France, etc. Since a horizontal synchronizing signal is included in the broadcast signal in any of the systems, the reception condition can be determined by whether or not the horizontal synchronizing signal is captured well. The analog demodulator of the present embodiment can be applied to any of the above systems.

Incidentally, the broadcast signal received by the tuner 31 as described above is decoded in the decoder 32 and transmitted to an image receiver 70 together with an OSD signal generated in the OSD circuit 33. The image receiver 70 outputs image and video according to the broadcast signal received by the tuner 31.

Figure 2:
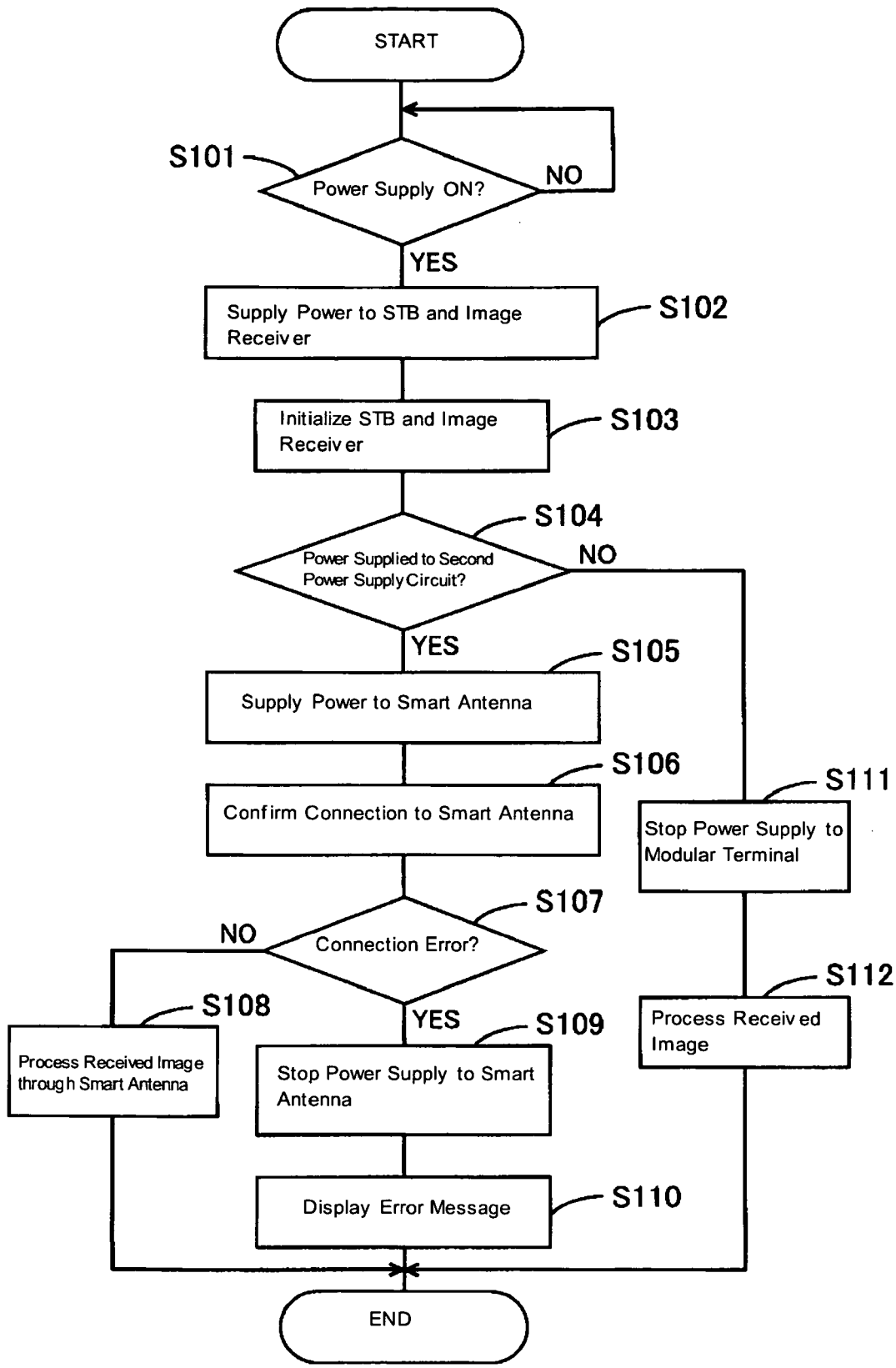
FIG. 2 is a flowchart for confirming connection of an antenna to the STB according to the present embodiment.

FIG. 2 is a flowchart for confirmation of connection of smart antenna 10 performed by CPU 35.

When a plug of the first AC adapter 51 is connected to a commercial AC outlet and the power is supplied to the STB 100 through the signal line 62, CPU 35 determines, at step S101, whether or not an operation to turn ON the power supply has been made by operation of the input unit 38. When it is determined that the power supply has been turned ON, the proceeding advances to step S102.

At step S102, CPU 35 starts supplying the power generated in the first power supply circuit 40 to units requiring power supply such as the tuner 31 and the image receiver 70.

Then, at step S103, CPU 35 starts initialization of the tuner 31, decoder 32, and OSD circuit 33, as well as the image receiver 70, according to contents of setting stored in the ROM 36 and the like.

Then, at step S104, CPU 35 determines whether or not power is supplied to the second power supply circuit 41 from the second AC adapter 52 through a signal line 63. The second power supply circuit 41 is for supplying the smart antenna 10 with required power by the same; when the smart antenna 10 is connected for use, it is necessary that the second AC adapter 52 be connected for supplying the power. Accordingly, it can be considered that the user intending to use the smart antenna 10 must necessarily have the second AC adapter 52 connected.

When it is determined, at step S104, that power for the second power supply circuit 41 is supplied, CPU 35 starts, at step S105, supplying power to the smart antenna 10 through the modular terminal 34.

At step S106, CPU 35 performs processing for confirming connection of the smart antenna 10. CPU 35 transmits a specific pulse signal to the smart antenna 10 through the modular terminal 34. Thereafter, CPU 35 determines whether or not a signal answering the specific pulse signal from the smart antenna 10 is received by the tuner 31 within a predetermined period of time; when it is determined that such a signal has been received, it is judged that the smart antenna 10 is properly connected. The predetermined period of time is such a time that is generally taken by a smart antenna 10 in answering such a specific pulse signal as described above, or it may be the period of time as above with a certain allowance added thereto, which may be properly decided for each apparatus.

The method for confirming connection is not limited to the above. Other methods for confirmation of connection, such as, for example, having the direction of the antenna aligned with a channel in which reception has already been confirmed, to determine whether or not the reception level varies to exceed a predetermined value. Or, these methods may be combined.

Then, at step S107, CPU 35 determines, as the result of the confirmation of connection of the smart antenna 10 performed at step S106, whether or not an error was made in the connection. If it is determined that there was made no connection error, i.e. that normal connection was made, the proceeding advances to step S108.

At step S108, CPU 35, responding to user's operation made on the input unit 38 and the like, performs image receiving process for properly outputting video and audio corresponding to the broadcast signal received by the smart antenna 10 onto the image receiver 70. This processing is continued until the power supply to the STB 100 is turned OFF by operation of the input unit 38 or the like.

On the other hand, when it was determined, at step S107, that an error occurred in the connection, CPU 35 stops the operation to supply power to the smart antenna 10 at step S109. Then, at step S110, CPU 35 causes the OSD circuit 33 to generate an error message to the fact that the smart antenna 10 is not normally connected, allows the message to be displayed on the image receiver 70, and stops the processing.

Now, the case where it is determined at step S104 that power is not supplied to the second power supply circuit 41 will be described. When it is determined at step S104 that power is not supplied to the second power supply circuit 41, CPU 35 determines at step S111 that power supply is not connected to the smart antenna 10 and having, needless to say, power supply to the smart antenna 10 stopped, CPU 35 stops power supply to the units related to the smart antenna 10 such as the modular terminal. Thus, CPU 35 performs processing to save power.

In the present embodiment as described above, not only power saving is realized by stopping power supply to the smart antenna 10 but further it can be realized by stopping operations of the pertinent circuits in the STB 100.

Since the apparatus is not connected with the smart antenna 10, CPU determines, at step S112, that it is connected with the YAGI antenna 20 and performs image receiving processing, in response to user's operation of the input unit 38 and the like, to appropriately output video and audio, corresponding to the broadcast signal received by the YAGI antenna 20, on the image receiver 70.

Now, an example of operations will be described according to the flowchart of FIG. 2.

First, a case where the smart antenna 10 is properly connected and power is supplied to the second power supply circuit 41 will be described.

The user connects the smart antenna 10 to the STB 100, inserts the plug of the second AC adapter 52 into an outlet and connects the second AC adapter 52 with the power receiving terminal of the second power supply circuit 41, so that power is supplied from the second AC adapter 52 to the second power supply circuit 41. Further, in order that power is supplied to the STB 100, the plug of the first AC adapter 51 is inserted into an outlet and the first AC adapter 51 is connected with the power receiving terminal of the first power supply circuit 40.

When power for the STB 100 is turned ON upon user's operation of the input unit 38, CPU 35 determines that the power is ON at step S101, supplies power to each unit of the STB 100 and the image receiver 70 at step S102, and initializes each unit of the STB 100 and the image receiver 70 at step S103. And, from the fact that the second AC adapter 52 is connected with the power receiving terminal of the second power supply circuit 41 and the plug of the second AC adapter 52 is inserted in an outlet, CPU 35 determines, at step S104, that power is being supplied to the second power supply circuit 41. Then, power is supplied to the smart antenna 10 at step S105 and the connection of the smart antenna 10 is confirmed at step S106.

From the fact that the smart antenna 10 is properly connected, it is determined, at step S107, that there is no connection error. Then, at step S108, in response to user's operation of the input unit 38 and the like, video and audio corresponding to the broadcast signal received by the smart antenna 10 are appropriately output on the image receiver 70. When the user makes operation of the input unit 38 to turn OFF the power, the processing as described above is ended.

Next, a case where the smart antenna 10 is not connected properly and power is supplied to the second power supply circuit 41 will be described.

In this case, the operations to step S106 will be omitted because they are the same as above and, hence, an example of operations from step S107 will be described below.

Since the smart antenna 10 is not properly connected, it is determined that there is a connection error at step S107, and power supply to the smart antenna 10 and others is stopped at step S109. Then, a message to the fact that the smart antenna 10 is not connected is generated in the OSD circuit 33 and displayed on the image receiver 70.

Finally, a case where the YAGI antenna 20 is connected and power is not supplied to the second power supply circuit 41 will be described.

In this is case, in order that power is supplied to the STB 100, the plug of the first AC adapter 51 is inserted into an outlet and the first AC adapter 51 and the power receiving terminal of the first power supply circuit 40 are connected together. At this time, the second AC adapter 52 and the power receiving terminal of the second power supply circuit 41 are not connected together and the plug of the second AC adapter 52 is not inserted in an outlet.

When power supply to the STB 100 is turned ON upon user's operation of the input unit 38, CPU 35 determines that the power is ON at step S101, supplies power to each unit of the STB 100 and the image receiver 70 at step S102, and performs initialization of each unit of the STB 100 and the image receiver 70 at step S103.

Since the second AC adapter 52 and the power receiving terminal of the second power supply circuit 41 are not connected with each other or the plug of the second AC adapter 52 is not inserted into an outlet, it is determined, at step S104, that power is not supplied to the second power supply circuit 41 and, at step S111, power supply to the smart antenna 10 and the modular terminal 34 etc. is stopped. Then, at step S112, in response to user's operation of the input unit 38 or the like, video and audio corresponding to a broadcast signal received by the YAGI antenna 20 are appropriately output on the image receiver 70. When the user operates the input unit 38 to turn OFF the power, these processes are ended.

Figure 3:
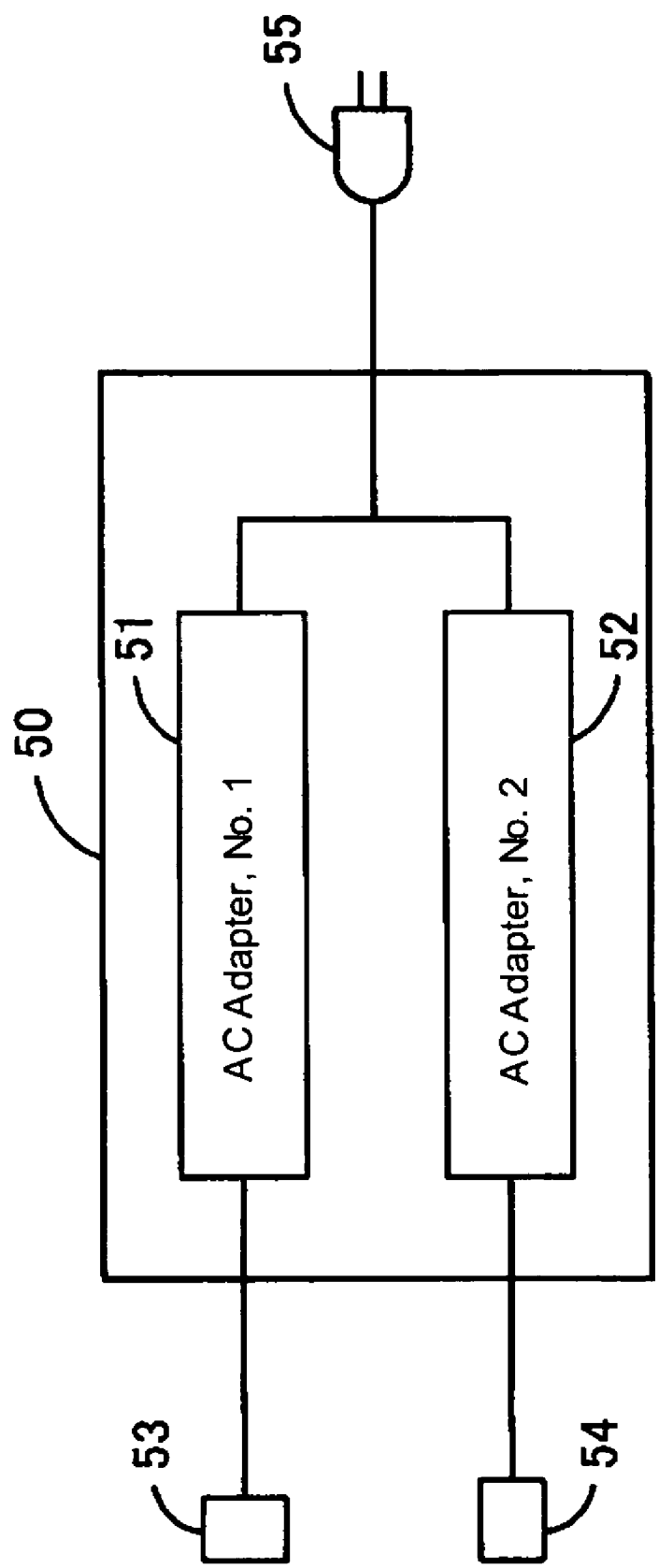
FIG. 3 is a schematic diagram of an AC adapter of the present embodiment.

FIG. 3 is a schematic diagram of an AC adapter 50.

The AC adapter 50 includes a first AC adapter 51 converting a commercial AC current into a DC current for the STB 100, a second AC adapter 52 for converting a commercial AC current into a DC current for the smart antenna 10, a connection terminal 53 to be connected to the power receiving terminal for supplying power to the first power supply circuit 40, a connection terminal 54 to be connected to the power receiving terminal for supplying power to the second power supply circuit 41, and a plug 55.

When commercial power is supplied from the plug 55, the first AC adapter 51 generates a DC current of 6V in compliance with EIA909 standard and the second AC adapter 52 generates a DC current of 12V in compliance with EIA909 standard. The connecting terminal 54 supplied with power from the second AC adapter 52 is connected to the power receiving terminal for supplying power to the second power supply circuit 41 of the STB 100 only when the smart antenna 10 is connected with the STB 100.

Incidentally, FIG. 3 shows an example where power is supplied from one plug to two AC adapters 51, 52 and each adapter generates the DC current required thereof However, it may also be arranged to use separate AC adapters and plugs as shown in FIG. 1 for each of the power receiving terminals of the first power supply circuit 40 and the second power supply circuit 41.

Although the antenna controller 11 is described as formed of a single unit in the above described embodiment, such a limited device is not intended in the broadcast receiving apparatus of the present invention. The STB 100 and the antenna controller 11 may be integrally structured or the antenna controller 11 and the smart antenna 10 may be integrally structured.

According to the present embodiment, the decision as to whether the apparatus is connected to the smart antenna 10 or it is connected to the YAGI antenna 20 can be automatically made without waiting for user's setting. When not connected to the smart antenna 10, power to the smart antenna 10 and to the pertinent units can be stopped to thereby achieve power saving.

Needless to say, the present invention is not limited to the above mentioned embodiment. As will be apparent to those skilled in the art, the following may be disclosed as exemplary embodiments of the present invention:

To use members, structures, and the like disclosed in the above embodiment replaceable with each other by properly changing their combination.

To use what are not disclosed in the above embodiment but are of known art and replaceable with the members, structures, and the like disclosed in the above embodiment by properly replacing them with each other or by changing their combination.

To properly use members, structures, and the like not disclosed in the above embodiment but thought of by those skilled in the art as substitutes for them on the basis of known art and the like or, further, with changes made in their combination.

While the invention has been particularly shown and described with respect to preferred embodiments thereof, it should be understood by those skilled in the art that the forgoing and other changes in form and detail may be made therein without departing from the spirit and scope of the invention as defined in the appended claims.

What is claimed is:

1. A broadcast receiving apparatus, comprising:
   a connection circuit connectable to a variable directivity antenna and a directional antenna;
   a tuner connected with the connection circuit for performing reception process of broadcast waves; and
   a control unit performing power supply to the variable directivity antenna and directivity control of the variable directivity antenna, the broadcast receiving apparatus further comprising:
   a first power receiving terminal for supplying necessary power to the broadcast receiving apparatus;
   a second power receiving terminal for supplying necessary power to the variable directivity antenna;
   a decision circuit for determining whether or not power is supplied to the second power receiving terminal;

a drive control circuit, when the decision circuit determines that the power is supplied to the second power receiving terminal, for driving the control unit to perform control of the variable directivity antenna;

a first power supply control circuit for controlling power supply to the variable directivity antenna; and a second power supply control circuit for controlling power supply to units related to the variable directivity antenna;

wherein if the power is supplied to the second power receiving terminal when the power is being supplied to the first power receiving terminal, the first power supply control circuit starts the power supply to the variable directivity antenna; and if the power is not supplied to the second power receiving terminal when the power is being supplied to the first power receiving terminal, the first power supply control circuit does not start the power supply to the variable directivity antenna and the second power supply control circuit stops the power supply to the units related to the variable directivity antenna.

2. The broadcast receiving apparatus according to claim 1, further comprising a commercial power adapter capable of supplying power individually to the first power receiving terminal and the second power receiving terminal.

3. The broadcast receiving apparatus according to claim 1, further comprising commercial power adapters each thereof being exclusively used for the first power receiving terminal and the second power receiving terminal.

4. The broadcast receiving apparatus according to claim 1, wherein the variable directivity antenna has directivities in sixteen directions and has no movable portion.

5. The broadcast receiving apparatus according to claim 1, wherein the variable directivity antenna has directivities in sixteen directions and has a movable portion.

6. The broadcast receiving apparatus according to claim 1, wherein the decision circuit is constituted of a CPU determining whether or not power is supplied to the second power receiving terminal.

7. The broadcast receiving apparatus according to claim 1, wherein the CPU controls power supply to an amplifier incorporated in the variable directivity antenna.

8. The broadcast receiving apparatus according to claim 1, wherein
the variable directivity antenna is a smart antenna having directivities in sixteen directions and having a movable portion;
the decision circuit is constituted of a CPU determining whether or not power is supplied to the second power receiving terminal; and
the second power receiving terminal supplies, under control of the CPU, power to an amplifier incorporated in the variable directivity antenna through the tuner, and the broadcast receiving apparatus is provided with an AC-DC adapter capable of dividing a power supply voltage from a commercial power source into required two power supply voltages and supplying the voltages individually to the first power receiving terminal and the second power receiving terminal.

9. The broadcast receiving apparatus according to claim 1, wherein
the units related to the variable directivity antenna include a modular terminal for controlling the variable directivity antenna through the control unit.

* * * * *